May 20, 1924.                                                    1,494,687
J. W. HINE
COMBINED BUMPER AND TOWING DEVICE FOR VEHICLES
Filed May 2 1921                    2 Sheets-Sheet 1
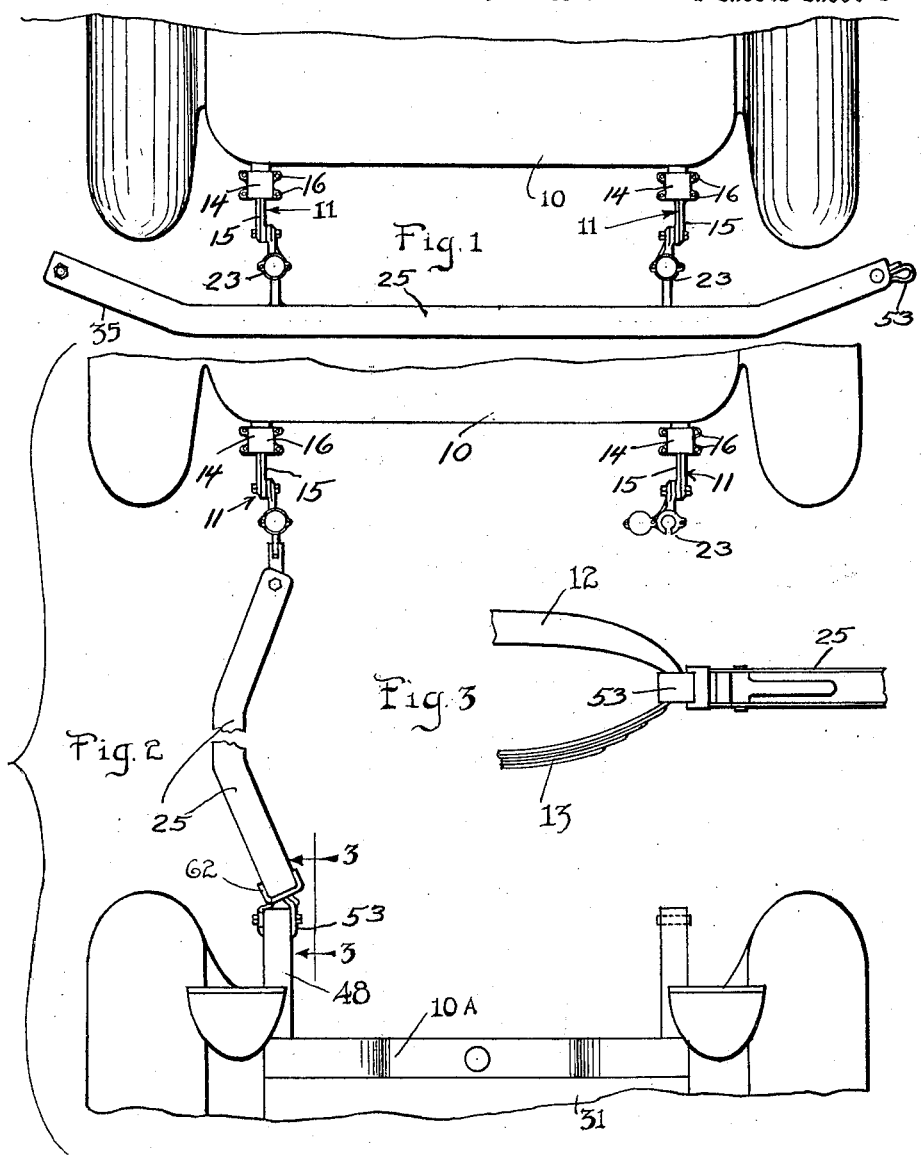
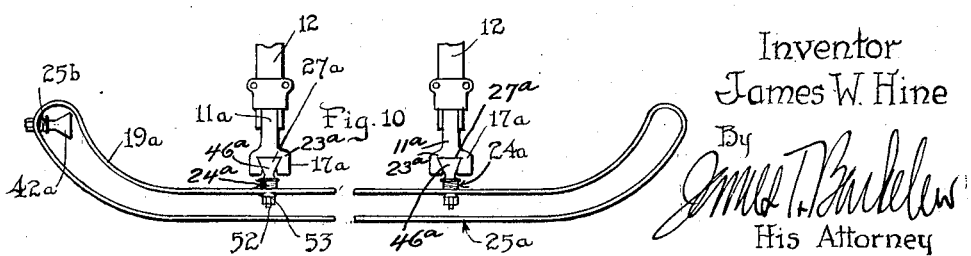
Inventor
James W. Hine
By James T. Burleson
His Attorney

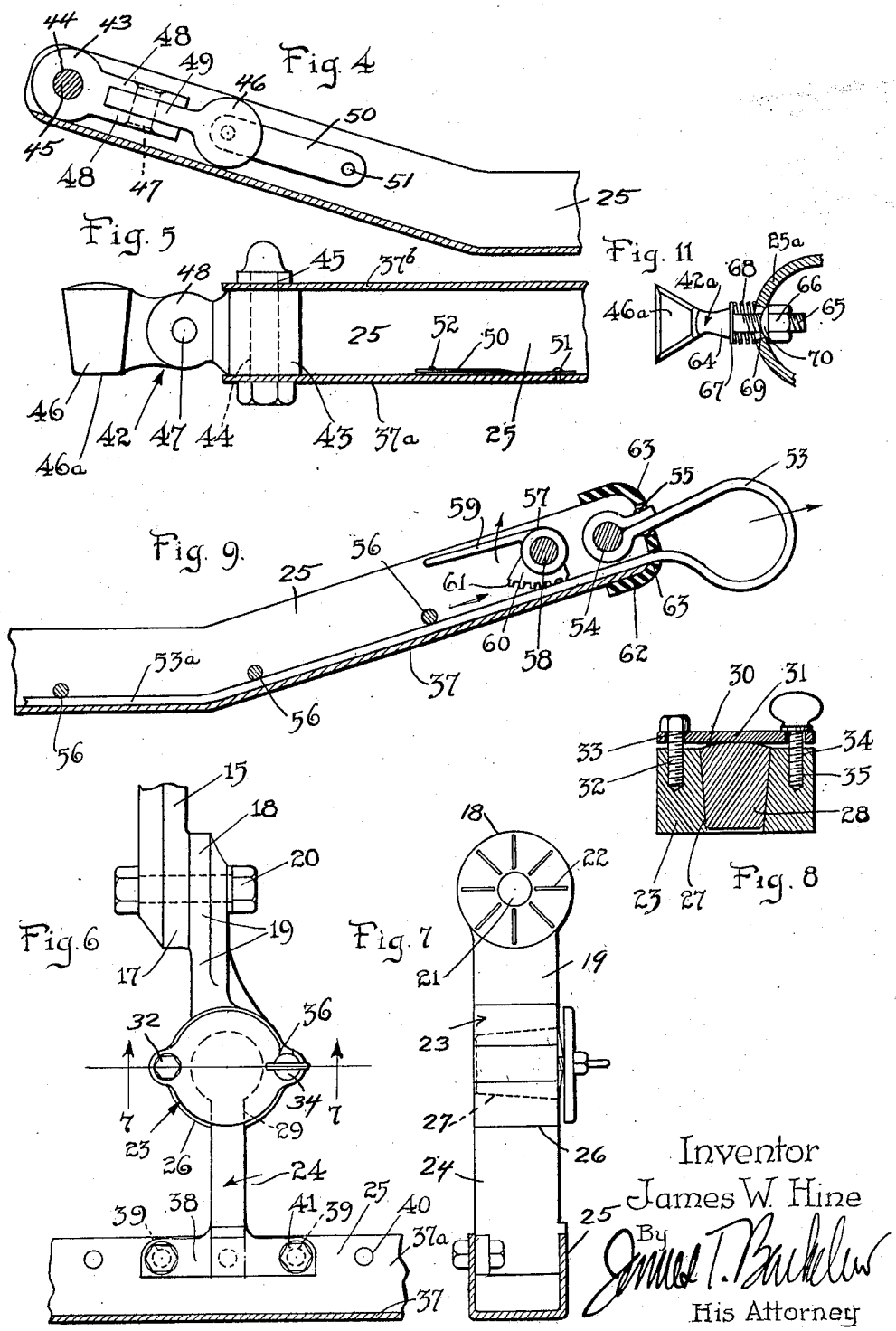
May 20, 1924.
J. W. HINE
1,494,687
COMBINED BUMPER AND TOWING DEVICE FOR VEHICLES
Filed May 2, 1921  2 Sheets-Sheet 2
Inventor
James W. Hine
His Attorney Patented May 20, 1924.

1,494,687

UNITED STATES PATENT OFFICE.

JAMES W. HINE, OF LOS ANGELES, CALIFORNIA.

COMBINED BUMPER AND TOWING DEVICE FOR VEHICLES.

Application filed May 2, 1921. Serial No. 466,152.

*To all whom it may concern:*

Be it known that I, JAMES W. HINE, a citizen of the United States, residing at Los Angeles, in the county of Los Angeles and State of California, have invented new and useful Improvements in Combined Bumpers and Towing Devices for Vehicles, and the following is such a full, clear, and exact disclosure of the invention that anyone skilled in the art to which it appertains may make and use the same.

This invention relates broadly to attachments for motor vehicles, and the like; and particularly to a combined bumper and towing device. In its preferred specific form, as hereinafter disclosed, the device embodies a combination of structural features whereby it may accomplish the double purpose of normally serving as a bumper, and, when required, be utilized as a tow line.

The invention resides mainly in affixing to bumpers of any of the well known types, certain attachments, and providing complementary mountings therefor, whereby it may be very easily and quickly adjusted for use either as a bumper or as a towing device. It is simple in construction, cheap to manufacture, efficient in operation, and very easily adjusted to its several uses.

It is a matter of common experience that flexible tow lines, such as steel cable, rope, or the like, now generally used, have proven unsatisfactory, for the reason that unless the strain of the load or pull is evenly and gradually applied to the line in starting, a failure generally takes place. This is due to the movement of the towing vehicle in first taking up the slack in the line, at the end of which movement the full load is suddenly applied to the line, causing it to snap. As it is practically impossible to always manipulate the towing vehicle in a manner to first entirely take up the slack in the line and draw it taut, and thereafter evenly and gradually apply the load or pull up to its limit, snapping or failure of the line frequently occurs. Of course, tow lines of sufficient weight and strength to withstand such strains could be used, but these, due to their weight and bulk, would be impractical for ordinary use.

It is therefore my foremost object, in connection with my invention, to provide a towing device which will form an inflexible connection or link between the towing and towed vehicles, yet having a universality of movement, to permit turning and to compensate for unevenness of roadbed, and which will obviate the possibility of failure due to sudden application of the full load of the tow.

A further feature is the combining of the elements in a single device for the accomplishment of a double use, thereby promoting economy of equipment, and subserving otherwise occupied storage space.

A full and complete disclosure of the structure and uses of the preferred specific form of my invention will be made in the following specification, reference being made therein to the accompanying drawings, illustrating such form, and in which—

Fig. 1 is a fragmentary plan view of the rear end of a typical motor vehicle, showing the application of my invention thereto as a bumper; Fig. 2 is a fragmentary plan view showing the front and rear ends of two motor vehicles, and the application of my device thereto in towing position; Fig. 3 is an enlarged fragmentary view showing one of the end attachments in elevation, as indicated by the line 3—3 of Fig. 2; Fig. 4 is a sectional plan view showing one of the end attachments in inoperative position; Fig. 5 is a detail view of the part shown in Fig. 4, extended to operative position; Fig. 6 is a plan view of one of the bumper supporting members shown in Fig. 1 and showing its supporting bracket; Fig. 7 is a side elevation of the part shown in Fig. 6; Fig. 8 is a sectional view taken as indicated by the line 8—8 in Fig. 6; Fig. 9 is a sectional plan view of an attachment on the end of the bumper member opposite to that shown in Fig. 4; Fig. 10 is a plan view of a modified form of bumper and attaching means; and Fig. 11 is an enlarged fragmentary detail view of the attaching means shown in Fig. 10.

In Fig. 1 the device is shown as applied to the rear end of a typical motor vehicle 10 to act as a bumper. It is removably supported on brackets 11, which in turn are removably mounted on the protruding portions 12 of the side frame members, these being shown in Fig. 3 as supported on semi-elliptic springs 13. The brackets 11 may be of any suitable design, and may be mounted on the frame members 12 in any suitable manner, the means here shown as being best adapted for the purpose consisting of split clamp members 14, one portion of which is formed integral with an arm 15, the other half being separate and removably secured thereto, to clamp around the frame member 12, by means of suitable bolts 16. The arms 15 extend outwardly from the clamp members 14, and terminate at their outer end in bearing plates 17, disposed in a vertical plane, the latter being adapted to be engaged by complementary bearing plates 18, on the inner ends of supporting arms 19; these two plates being adapted to be held in facial contact, and adjustable relation, by means of suitable bolts 20 extending through axial apertures therein. The bearing plates may be of any suitable construction and configuration, but preferably circular as shown in the drawings, and have their contacting faces corrugated, or ribbed, as shown at 22, for the purpose of enabling the arms 15 and 19 to be held in relative adjusted relation.

The arms 19 terminate at their outer ends in socket members 23 (see Figs. 6, 7 and 8); these socket members being adapted to removably support and carry arms 24 rigidly mounted on the bumper member 25. The socket members 23 may be of any suitable design, and preferably formed integral with the arms 19, the preferred form being that shown in the drawings, each comprising an enlarged circular end portion 26, on the arm 19, having a tapered bore 27 therein, extending at right angles to the plane of the arm 19. Each bore 27 is adapted to receive a similarly tapered circular portion formed on the end of the arm 24, to support the latter in a plane with the arms 15 and 19. Each socket portion 26 is inwardly slotted, as at 28, throughout its depth to accommodate the arm 24 when the end portion 28 is seated in the bore 27. The top face 30, of the portion 28, is preferably formed arcuate or with a crown, this surface being engaged by a locking plate 31 pivotally mounted on the end 26, as by means of a cap screw 32 extending through a bore 33 in one side thereof; this plate being held in contact with the surface 30, in its adjusted position, by means of a locking screw 34. The screw 34 screw-threadedly engages a bore 35, diametrically opposite screw 32, and is also adapted to be engaged in a slot 36 in the plate 31, whereby the latter is adapted to removably engage the surface 30, to hold the portion 28 in the bore 27, and adapted to be clamped in latched position by means of the thumb screw 34.

While I have shown and described the arms 15 and 19 to be separable and to be adjustable relative to each other, and removably mounted on the frame members 12, and the arm 19 as having a particular kind of socket, it is nevertheless readily apparent that numerous alterations and changes may be made in this particular portion of the structure without affecting the spirit of the invention, as, for instance, the arms 15 and 19 may consist of a single solid member clamped upon the frame members 12, and adjusted to support the removable arms 24, on the bumper member 25.

The bumper member 25, while it may be of any preferred cross-sectional configuration, such as flat, round or channel-like, it is here shown as being channel-like in cross sectional configuration mounted with its web 37 facing outwardly, or away from the vehicle 10. The arms 24 are provided with T-ends 38, these ends being provided with apertures 39 adapted to register with apertures 40, in the bumper member 25, (see Fig. 6) for the reception of bolts 41 by means of which the arms are rigidly secured to the bumper members. A plurality of the apertures 40 may be provided in the lower flange 37$^a$, of the bumper member, as shown in the drawings, so the arms 24 may be mounted upon the bumper member at varying distances apart, thereby making it adjustable to vehicles having different distances between the side frame members 12.

To permit the use of the bumper members 25 as a towing device, an arm, generally designated by the numeral 42, is pivotally mounted upon one end of the member 25, the arm 42 having an enlarged end 43 with a bore 44 therein, forming a bearing adapted to extend between the flanges 37$^a$ and 37$^b$, of the member 25, and be retained therein by means of a bolt 45 extending through these flanges and through the bore 44, as shown in the drawings. This arrangement forms a connection pivotal in a horizontal plane, the purpose of which will be hereinafter explained. The arm 42 has a tapered cylindrical end portion 46, identical with the end portions 28 of the arms 24, which is adapted to seat in one of the tapered bores 27, on an arm 19, when the bumper member is used as a towing device. The portions 43 and 46, of arm 42, are hingedly secured together by means of a pivot pin 47, extending at right angles to the bore 44, and extending through a bifurcated arm 48, formed integral with the portion 43, and a tongue 49, formed integral with the portion 43. Thus it will be seen that the arm 42 being horizontally pivotally mounted on the bumper member 25 by means of the bolt 45 extending through bore 44 and the flanges of the bumper member, and the end portion 46 being mounted on the member 43' to pivot in a plane with the bore 44, forms a universal joint in this connection to permit turning of the vehicles when the bumper member is used as a towing device, and which, by reason of this pivotal connection will compensate for unevenness of the roadbed. The arm 42 might be correctly termed a universal joint between the bumper member and the socket 23 to which it is designed to be attached.

The portion 46 is adapted to be retained in the tapered socket 27, of the portion 26, by means of the locking plate 31, in the manner described in connection with the retention therein of the arm 24. The arm 42 is illustrated in Fig. 5 as extended in position to be attached and connect the bumper member 25 with the towing vehicle, and in Fig. 4 as being folded within the bumper member, or between the flanges 37$^a$ and 37$^b$, when the bumper member 25 is being used as a bumper. In the latter position, while the parts are designed to fit closely between the flanges 37$^a$ and 37$^b$, of the member 25, a flat spring 50, secured to the flange 37$^a$ at one end by a rivet 51 or other suitable means, and is provided at its opposite or free end with a small hump 52, pressed out of the metal, which hump is adapted to engage a corresponding depression in the bottom face 46$^a$, of the member 46, forcing the latter upwardly and holding it in contact with the flange 37$^b$ to prevent rattling and accidental displacement from this position. The spring 50 is positioned to automatically engage the depression in the member 46 when the latter is swung between the flanges 37$^a$ and 37$^b$, and is also constructed to permit the removal of the member from between these flanges by the application of slight pressure.

The opposite end of the bumper member 25 (see Figs. 2 and 9) is adapted to be removably secured to the vehicle being towed,—in this case designated by the numeral 10$^a$ (Fig. 2),—by means of a strap 53, formed of leather or other suitable material. The strap 53 is secured to the bumper member 25, so it will pivot relative thereto, by means of a pin 54, extending vertically between the flanges 37$^a$ and 37$^b$, (Fig. 9) one end of it being extended around this pin and secured upon itself by means of a rivet 55, as shown in the drawings. The opposite end of the strap 53 is left free so it can be extended around a convenient part of the vehicle being towed (see Fig. 2) and then extended inwardly along the web 37 of the member 25, between it and the pin 54; a plurality of pins 56, extending between the flanges 37$^a$ and 37$^b$, and spaced a slight distance from the web 37, being provided to hold the free end 53$^a$ adjacent the web 37.

A clamp member 57 is pivotally mounted on a pivot pin 58, extending between the flanges 37$^a$ and 37$^b$ (see Fig. 9) and adapted to engage the strap 53 to clamp it against the web 37, to form a locking means therefor. This clamp member is provided with a handle 59, for hand operation, and a clamping portion 60, whose clamping face is formed eccentric to the pin 58. The clamping face of the portion 60 may be either smooth, or it may be creased or corrugated as at 61, in the manner shown. To release the strap 53 the arm 59 is thrown in the direction indicated by the arrow (Fig. 9), so that when in clamping engagement with the strap 53 a load pulling upon the strap, in the direction indicated by the arrow, will serve to more tightly clamp the strap 53 against the web 37.

In order to prevent rattling and provide the best possible connection I provide a rubber pad 62, preferably flat, having apertures 63 through which the strap 53 is adapted to extend, in the manner shown in Fig. 9 so this pad will be interposed between the end of the bumper member and the part to which it is attached upon the vehicle being towed, (Fig. 2). Thus it will be seen that the strap 53 will provide a rigid connection longitudinally of the bumper member 25, when attached as a towing device, yet at the same time permits sufficient flexibility to compensate for unevenness of roadbed and to permit turning of the vehicle. The strap 53 when attached to the vehicle being towed will be drawn up sufficiently tight to draw the rubber plate 62 in contact with the portion to which it is attached, thereby preventing rattling of the parts, and providing a cushion between the end of the member 25 and that portion of the vehicle.

While the latter described connection is preferable in my device, for attachment to vehicles not provided with other attaching means, it is nevertheless clear that in case the vehicle being towed is equipped with my device, and is provided with brackets 11, having sockets 23, that an arm 42 may be likewise mounted on the last mentioned end of the bumper member 25 to engage such sockets for towing purposes in the manner hereinbefore stated. The strap 53, and the arrangement for adjusting and securing the same is merely provided for use in case the vehicle being towed is not equipped with brackets 11.

A modified form of attaching means is shown in Figs. 10 and 11 and is shown to be applied to a bumper of the flat spring type. The supporting arms 24$^a$ (Fig. 10) and the adjustable arms 42$^a$, (Fig. 11) in this case, are each typical, and are shown to consist of a main portion 64 on the end of which is a dove-tailed head portion 46$^a$, formed integral therewith, the opposite end of the shank being reduced, as at 65, and screw-threaded for the reception of a suitable nut 66. The end portion 46$^a$ is tapered toward this bottom (Fig. 11) and is adapted to seat in a dove-tailed slot 27$^a$, in the end of the socket 23$^a$, (Fig. 10) of the supporting bracket 11$^a$. The brackets 11$^a$ are similar in construction to the brackets 11, with the exception of the portion 23ª, which is modified in structure as above stated. Both the arms 24ª and 42ª have flat washers 67 surrounding their reduced portions 65, between which washers and the bumper member 25ª coil springs 68 are confined to lend flexibility to the mounting of these elements; and additionally in case of the arm 42ª to prevent rattling of this element when the device is being utilized as a bumper. The reduced portion 65 of the arm 42ª extends through an aperture 69, in one end of the bumper portion 25ª, (Figs. 10 and 11) this aperture being slightly larger than the diameter of the portion 65 and flared outwardly, and the nut 66 having a rounded portion 70 contacting with the inner periphery of the aperture 69, to form a more or less universal joint between the arm 42ª and the member 25ª. This type of joint permits flexibility of movement laterally and permits making turns and compensates for unevenness of the roadbed.

It will be noted in Fig. 10 that the arm 42ª is turned inwardly to extend between the two portions of the bumper member 25ª, adjacent the return bend 25ᵇ, so as to be out of the way when the device is being utilized as a bumper. By merely unscrewing the nut 66 and inserting the shank portion 56 through the aperture 69 in the opposite direction, as shown in Fig. 11, the device is made ready to be utilized as a towing device.

The uses and advantages of my invention are obvious.

From the foregoing description it can be readily seen how the device may be utilized as a bumper, and when the occasion arises how it may be easily and quickly removed from the arms supporting it in its position as a bumper and very readily adjusted to use as a towing device. From the foregoing description of the device it will be also readily apparent that there will not be such longitudinal flexibility in it, as a connecting link between the towing and towed vehicle, as will permit the load or strain of the pull to be so quickly and suddenly applied as to cause its failure.

While I have here shown and described a preferred embodiment of my invention it is nevertheless to be understood that I reserve the right to make any changes or modifications in structure, which may occur to anyone skilled in the art and which come within the scope of the following claims.

Having described a preferred form of my invention, I claim:

1. The combination with a vehicle of a combined bumper and towing device, comprising a substantially inflexible bumper member, means to removably mount said member on the vehicle to act as a bumper, and universal connecting means on the said member to attach it as a towing device.

2. The combination with a vehicle of a combined bumper and towing device, comprising a substantially inflexible bumper member, means to removably mount said member on the vehicle to act as a bumper, and means on the ends of said member to attach it as a towing device.

3. The combination with a vehicle of a combined bumper and towing device, comprising a bumper member, mounting means on the vehicle, complementary mounting means on the member to removably engage the mounting means on the vehicle, when serving as a bumper, and universal connecting means on the bumper member to attach it as a towing device.

4. The combination with a vehicle of a combined bumper and towing device, comprising a bumper member, mounting brackets rigidly mounted on the vehicle, complementary supporting arms on the bumper member to removably engage the said brackets on the vehicle when serving as a bumper, and means on the ends of said bumper member to attach it as a towing device.

5. The combination with a vehicle of a combined bumper and towing device, comprising a bumper member, mounting brackets rigidly mounted on the vehicle, complementary adjustable supporting arms rigidly mounted on the bumper member to removably engage the said brackets on the vehicle when serving as a bumper, and pivotal means on the ends of said bumper member to attach it as a towing device.

6. The combination with a vehicle of a combined bumper and a towing device, comprising a bumper member, mounting brackets rigidly mounted on the vehicle, complementary longitudinally adjustable supporting arms rigidly mounted on the bumper member to removably engage the said brackets on the vehicle when serving as a bumper, and pivotal means on the ends of said bumper member to attach it as a towing device.

7. The combination with a vehicle of a combined bumper and towing device, comprising a bumper member, mounting brackets rigidly mounted on the vehicle, tapered seats in the brackets, supporting arms on the bumper member having complementary tapered ends to removably engage the tapered seats in the brackets when serving as a bumper, and means on the ends of said bumper member to attach it as a towing device.

8. The combination with a vehicle of a combined bumper and towing device, comprising a bumper member, mounting brackets rigidly mounted on the vehicle, tapered seats in the brackets, longitudinally adjustable supporting arms on the bumper member having complementary tapered ends to removably engage the tapered seats in the brackets when serving as a bumper, and means on the ends of said bumper member to attach it as a towing device.

9. The combination with a vehicle of a combined bumper and towing device, comprising a bumper member, mounting brackets rigidly mounted on the vehicle, tapered seats in the brackets, longitudinally adjustable supporting arms on the bumper member having complementary tapered ends to removably engage the tapered seats in the brackets when serving as a bumper, and pivotal means on the ends of said bumper member to attach it as a towing device.

10. The combination with a vehicle of a combined bumper and towing device, comprising a bumper member, mounting brackets rigidly mounted on the vehicle, tapered seats in the brackets, longitudinally adjustable supporting arms on the bumper member having complementary tapered ends to removably engage the tapered seats in the brackets when serving as a bumper, yielding means to hold the said tapered ends in the seats, and pivotal means on the ends of said bumper member to attach it as a towing device.

11. The combination with a vehicle of a combined bumper and towing device, comprising a bumper member, mounting brackets rigidly mounted on the vehicle, complementary supporting arms on the bumper member to removably engage the said brackets when serving as a bumper, and means on the ends of the said bumper members to attach it as a towing device, said means consisting of an arm pivotally mounted on one end, the said arm having a complementary end portion adapted to removably engage one of the brackets on the vehicle, and adjustable means on the other end for attaching it to the vehicle being towed.

12. The combination with a vehicle of a combined bumper and towing device, comprising a bumper member, mounting brackets rigidly mounted on the vehicle, complementary supporting arms on the bumper member to removably engage the said brackets when serving as a bumper, and means on the ends of the said bumper member to attach it as a towing device, said means consisting of an arm pivotally mounted on one end, the said arm having a complementary end portion adapted to removably engage one of the brackets on the vehicle and adjustable means on the other end for attaching it to the vehicle being towed, and a resilient shock absorbing element interposed between the last mentioned end and the portion of the vehicle to which it is attached.

13. The combination with a vehicle of a combined bumper and towing device, comprising a bumper member, mounting brackets rigidly mounted on the vehicle, complementary supporting arms mounted longitudinally adjustable on the bumper member to removably engage the said brackets when serving as a bumper, and means on the ends of the said bumper member to attach it as a towing device, said means consisting of an arm pivotally mounted on one end, the said arm having a complementary end portion adapted to removably engage one of the brackets on the vehicle and adjustable means on the other end for attaching it to the vehicle being towed, and a resilient shock absorbing element interposed between the last mentioned end and the portion of the vehicle to which it is attached.

14. The combination with a vehicle of a combined bumper and towing device, comprising a bumper member, mounting brackets rigidly mounted on the vehicle, tapered seats in the brackets, supporting arms mounted longitudinally adjustable on the bumper member, complementary tapered ends on the supporting arms to removably engage the said seats in the brackets when the bumper member is serving as such, and means on the ends of said bumper member to attach it as a towing device, said means consisting of an attaching arm pivotally mounted on one end and having a complementary end portion adapted to removably engage the tapered seat in one of the supporting brackets, adjustable pivotable means on the other end for attaching it to the vehicle being towed, and a resilient shock absorbing element adapted to be interposed between the last mentioned end and the portion of the towed vehicle to which it is attached.

15. In a combined bumper and towing device the combination of a bumper member, supporting brackets therefor adapted to be mounted on a vehicle, supporting arms on the bumper member adapted to removably engage the supporting brackets when the said member is serving as a bumper, and means on the ends of said member to attach it as a towing device, said means consisting of an attaching arm mounted on one end, the said arm having one end adapted to engage one of the said brackets, and adjustable means on the other end for securing it to the vehicle being towed.

16. In a combined bumper and towing device the combination of a bumper member, supporting brackets therefor adapted to be mounted on a vehicle, supporting arms on the bumper member adapted to removably engage the supporting brackets when the said member is serving as a bumper, and means on the ends of said member to attach it as a towing device, said means consisting of an attaching arm pivotally mounted on one end, the said arm having one end adapted to engage one of the said brackets, and adjustable means on the other end for securing it to the vehicle being towed.

17. In a combined bumper and towing device the combination of a bumper member, supporting brackets therefor adapted to be mounted on a vehicle, supporting arms on the bumper member adapted to removably engage the supporting brackets when the said member is serving as a bumper, and means on the ends of said member to attach it as a towing device, said means consisting of an attaching arm pivotally mounted on one end, the said arm having an end adapted to engage one of the said brackets, yielding retaining means to hold the said arm in inoperative position, and adjustable means on the other end for securing it to the vehicle being towed.

18. In a combined bumper and towing device the combination of a bumper member, supporting brackets therefor adapted to be mounted on a vehicle, supporting arms on the bumper member adapted to removably engage the supporting brackets when the said member is serving as a bumper, yielding means on the brackets for releasably holding the said arms in engagement therewith, and means on the ends of said member to attach it as a towing device, said means consisting of an attaching arm pivotally mounted on one end, the said arm having an end adapted to engage one of the said brackets, yielding retaining means to hold the said arm in inoperative position, and adjustable means on the other end for securing it to the vehicle being towed.

In witness that I claim the foregoing I have hereunto subscribed my name this 11th day of April, 1921.

JAMES W. HINE.

Witness:
VIRGINIA BERINGER.